RICHARD D. BURCHILL, OF TAMPA, FLORIDA, ASSIGNOR OF FIFTY ONE-HUNDREDTHS TO WILLIAM A. VARNEDOE, OF TAMPA, FLORIDA.

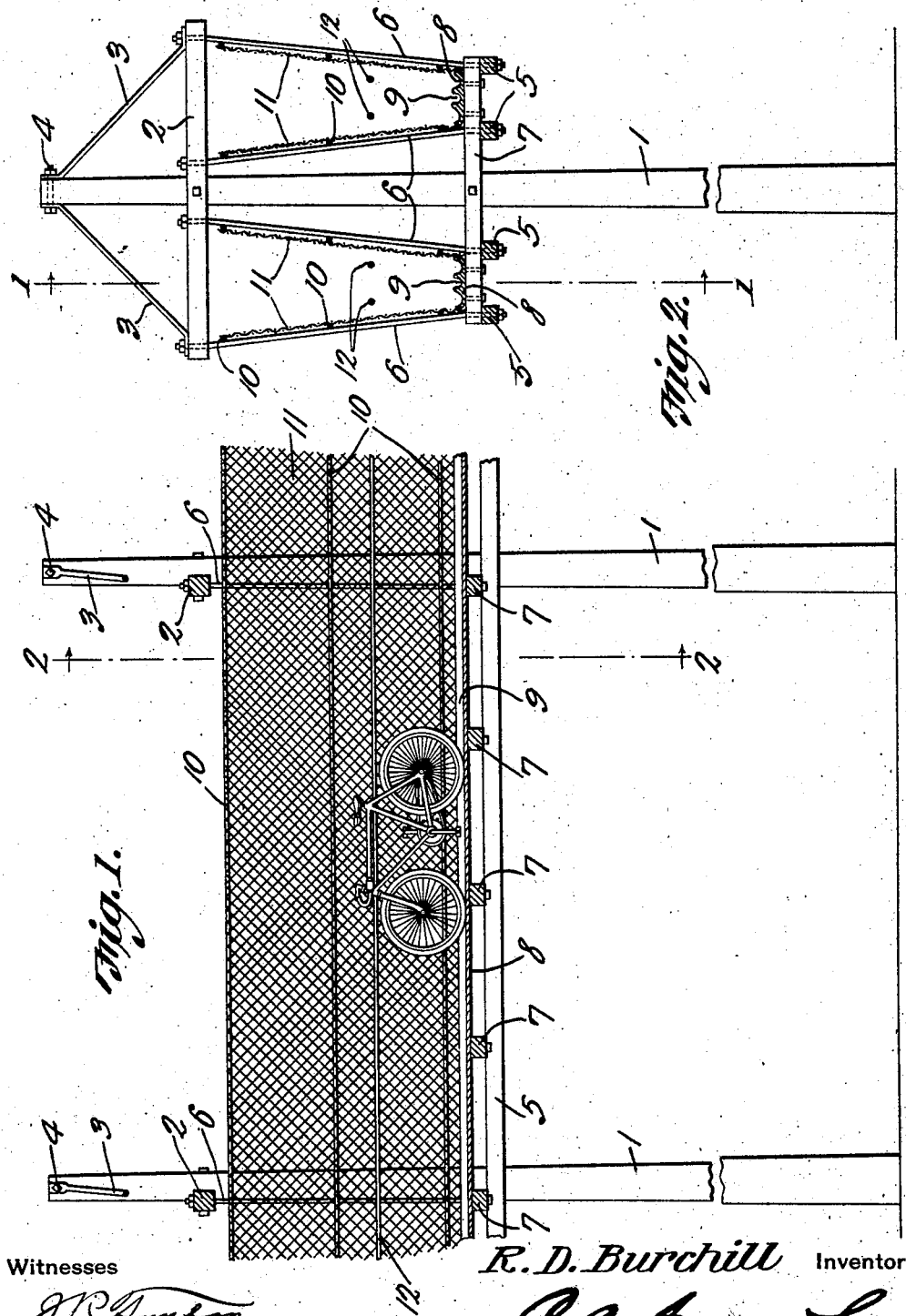

AERIAL BICYCLE-TRACK.

1,189,423.   Specification of Letters Patent.   Patented July 4, 1916.

Application filed March 28, 1916. Serial No. 87,247.

*To all whom it may concern:*

Be it known that I, RICHARD D. BURCHILL, a citizen of the United States, residing at Tampa, in the county of Hillsborough and State of Florida, have invented a new and useful Aerial Bicycle-Track, of which the following is a specification.

The present invention is an aerial bicycle track, and aims to provide a novel and improved structure of that character, which can be used as a race track for bicycles, or which can be used as a track to enable cyclists to travel from place to place conveniently.

It is the object of the invention to provide an aerial bicycle track of comparatively simple and inexpensive construction, which is also substantial and safe, and which will afford efficacious means for holding competitive bicycle races, and the like.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a fragmental longitudinal section of the track taken on the line 1—1 of Fig. 2. Fig. 2 is a cross section taken on the line 2—2 of Fig. 1.

The present track is mounted upon poles 1 disposed at suitable intervals along the course of the track and constructed of wood, metal, or other suitable material. Wooden or other suitable cross beams or bars 2 are bolted or otherwise secured between their ends to the poles 1 adjacent the upper ends thereof, and the ends of said beams 3 are connected by inclined braces or tie rods 3 with the upper ends of the poles, the upper adjacent ends of said rods 3 being bolted or otherwise fastened, as at 4, to the poles.

At the opposite sides of the poles 1 there are pairs of wooden or equivalent rails 5 running the length of the track, and said rails 5 are suspended from the beams 2 by hanger rods 6. These hanger rods 6 diverge upwardly, and the outer ones are engaged with the lower ends of the brace rods 3, the ends of the rods 6 being engaged through the rails 5 and beams 2, and being anchored thereto in any suitable manner. Cross ties 7 of wood or other material are secured upon the rails 5 at suitable intervals, and some of these ties 7 are attached to the poles 1 between their ends, and are also engaged with the hanger rods 6.

The foregoing parts provide a substantial over-head frame or superstructure, which may be at a suitable height above the ground. Secured upon the ties 7 between the respective sets of hanger rods 6, are longitudinal track plates 8, which are provided between their edges with grooves 9 in which the wheels of the bicycles are adapted to run, to guide the wheels properly along the track. The grooves 9 are sufficiently wide to permit the bicycles to be steered, so that the riders can maintain their equilibrium, but the grooves 9 need not be much wider than the tires.

Longitudinal wires or rods 10 arranged in vertically spaced relation, are attached to each set of hanger rods 6, and screens or equivalent sheets 11 are secured to the wires 10 and rods 6, to provide foraminous or transparent sides for the two trackways. These screens prevent the riders from falling, and act as a safe guard, but do not hinder the onlookers from observing the riders.

The track can be provided at suitable points with landings to enable the riders to enter and leave the track.

The bicycles can travel in the grooves 9 of the trackways in a convenient manner, and no devices are employed for maintaining the bicycles in upright position, since this is left to the skill of the cyclists.

The numbers of trackways can be varied, since various numbers of hangers 6 can be used by providing beams 2 and ties 7 of suitable length. The track can be straight, circular, or of other shape.

The track can be used for the operation of motor cycles as well as bicycles, and a pair of wires 12 can be strung above each of the plates 8 to serve the office of safe guards. It is also possible to eliminate the adjacent screens 10, and to use opaque screens at the outside of the track, to prevent the movements of the riders being observed, except at such points where desired.

Having thus described the invention, what is claimed as new is:

1. An aerial bicycle track embodying poles, beams attached thereto, hangers suspended from said beams, rails suspended by said hangers, cross ties attached to the rails, and a track member secured upon the ties between the hangers.

2. An aerial bicycle track embodying poles, beams attached thereto, pairs of hangers hung from said beams, and a track plate suspended from said hangers and disposed therebetween, said plate having means for guiding the wheels of a bicycle.

3. An aerial bicycle track embodying poles, beams attached thereto, hangers suspended from said beams, longitudinal rails suspended from said hangers, cross ties secured upon said rails, track plates secured upon the ties between the hangers, longitudinal wires attached to the hangers, and side screens attached to the hangers and wires.

4. An aerial bicycle track embodying poles, beams attached thereto, hangers having their upper ends engaged with the beams, longitudinal rails engaged with the lower ends of the hangers, cross ties secured upon the rails, certain of the ties being attached to the poles, and a longitudinal track plate secured upon the ties and provided with a wheel guiding groove.

5. An aerial bicycle track embodying poles, beams secured between their ends to the poles, braces connecting the ends of the beams and poles, pairs of hangers at the opposite sides of the poles and having their upper ends engaged with the beams, pairs of longitudinal rails at the opposite sides of the poles engaged with the lower ends of the hangers, the hangers diverging upwardly, cross ties secured upon the rails, certain of the ties being secured to the poles between their ends, longitudinal track plates secured upon the ties and having wheel guiding grooves, and side screens attached to the hangers.

In testimony that I claim the foregoing as my own, I have hereto affixed my signature in the presence of two witnesses.

RICHARD D. BURCHILL.

Witnesses:
  D. M. SMITH,
  G. J. DUNCAN.